United States Patent [19]

Korejwa et al.

[11] 3,900,545

[45] Aug. 19, 1975

[54] PROCESS FOR PRODUCING OBLONG HOSE

[75] Inventors: Alfred Korejwa, Crestline; Walter J. Layer; Richard E. Ruda, both of Bucyrus, all of Ohio

[73] Assignee: Amerace Corporation, New York, N.Y.

[22] Filed: Nov. 16, 1973

[21] Appl. No.: 416,616

Related U.S. Application Data

[62] Division of Ser. No. 101,156, Dec. 23, 1970, which is a division of Ser. No. 849,951, Aug. 14, 1969, Pat. No. 3,581,778.

[52] U.S. Cl. ............... 264/89; 264/90; 264/95; 264/99; 264/173; 264/177 R; 264/209; 264/295
[51] Int. Cl.².....B29C 17/02: B29D 3/02; B29D 23/05
[58] Field of Search .......... 264/173, 166, 347, 209, 264/210, 177 R, 294, 320, 334, 313, 280, 171, 239, 89, 90, 92, 95, 94, 98, 99, 174, 295

[56] References Cited
UNITED STATES PATENTS

| 2,810,424 | 10/1957 | Swartswelter et al. | 264/173 X |
| 2,918,394 | 12/1959 | Smith | 138/119 UX |
| 3,358,609 | 12/1967 | Worth et al. | 417/477 |

OTHER PUBLICATIONS

Modern Plastics Encylopedia, 62 Issue, September 1961, Vol. 39, No. 1A, pp. 695–701.
"The Randolph Pump" (An advertisement of the Randolph Co.), Available in 1962.

*Primary Examiner*—Jan H. Silbaugh
*Attorney, Agent, or Firm*—S. Michael Bender; R. A. Craig; Martin Sachs

[57] ABSTRACT

A plurality of processes are disclosed for producing novel hose means characterized by an oblong-shaped inside transverse cross-section and being fabricated from a material having elastic memory. The elastic memory material is extruded about an oblong die and suitably treated to form a tube normally having a flattened ribbon-like condition along substantially its entire length. A reinforcing layer may then be applied about the tube and an outer covering extruded over the reinforced tube. Exemplary elastic memory materials which may be employed to produce the tube and/or the outer covering for same comprise thermoplastic or thermosetting materials.

5 Claims, 2 Drawing Figures

PROCESS FOR PRODUCING OBLONG HOSE

This application is a division of application Ser. No. 101,156 filed Dec. 23, 1970, which is a division of application Ser. No. 849,951 filed Aug. 14, 1969, now U.S. Pat. No. 3,581,778.

BACKGROUND OF THE INVENTION

Hose having a round transverse cross section exhibits shortcomings in certain circumstances of storage and use. For example, conventional hose is particularly subject to kinking and twisting and is otherwise unwieldy during normal handling. Further, circular cross section hose is by nature demanding of certain space commitments for storage.

Additionally, fluid tends to remain in circular hose, when fluid pressure is removed. Should outside temperatures fall below the freezing point of the fluid within, such fluid can freeze and thereby block the hose and render it inoperable.

It has long been the desire of the fluid transport industry to provide hose free of the above shortcomings. This invention does so.

SUMMARY OF THE INVENTION

It is a primary object of this invention to provide processes for producing an improved hose having improved kink and twist resistance and handling properties over conventional hose, and requiring less storage space. It is another object to provide processes for producing hose having a self-draining capacity.

The above and other objects are met in a hose normally having an oblong or flattened inside transverse cross-section and being adapted to assume a non-flattened substantially cylindrical cross-section in response to a fluid pressure applied through one end of the hose. The material of the hose has elastic memory and thus provides means for causing the hose to return to its normal oblong or flattened condition upon the cessation or removal of the fluid pressure whereby any residual fluid remaining in the hose is automatically expelled through the latter's open end. The hose may include reinforcement as required by the circumstances of use to be encountered.

DESCRIPTION OF THE INVENTION

Figure 1:
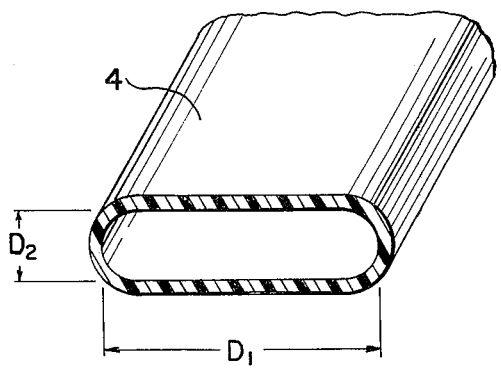
FIG. 1 is a fragmentary perspective view in transverse section of an oblong non-reinforced hose of the invention.

Referring now to FIG. 1, there is schematically shown a flexible tubular non-reinforced hose 4 normally having an oblong transverse cross-section. Thus, as indicated, hose 4 has in inside cross-section, a major dimension $D_1$ and a minor dimension $D_2$, with the dimension $D_1$ being substantially greater than the dimension $D_2$. This gives to the hose 4 a characteristic flattened ribbon-like appearance in the unpressurized or non fluid-conveying state.

In accordance with the present invention, the flexible normally oblong tubular hose 4 is fabricated from a material having elastic memory.

Materials having an elastic memory and suitable for this invention, when performed into the tublar oblonged shaped hose of FIG. 1, have the ability to assume a circular substantially inside transverse cross-sectional configuration in a controlled fashion under pressure and to return to their initial oblong configuration in the absence of or removal of pressure. Suitable materials which have such elastic memory and which can be used in practicing this invention include elastomers and elastomeric compounds, both thermoplastic and thermosetting. Particularly preferred materials include plasticized polyvinyl chloride and natural and/or synthetic rubber compounds.

For best practical results the ratio of cross-sectional dimension $D_1$ to cross-sectional dimension $D_2$ should be at least about 4 to 1, although satisfactory results have been obtained with lower ratios than 4 to 1. It has been discovered that hoses fabricated of a material having an elastic memory and having the configuration shown in FIG. 1 exhibit significant self-draining properties, that is, as mentioned above they change under fluid pressure from their original oblong shape to a substantially circular or cylindrical shape for efficient fluid movement and, upon cessation of fluid pressure, they immediately and automatically assume the initial oblong configuration, thereby discharging fluid that would remain in conventional circular hose. What is believed to actually happen is that as the oblong shaped hose deforms into a substantially cylindrically shaped hose in response to a fluid pressure applied therein through one of its ends, energy is absorbed from the pressurized fluid and is temporarily stored in the hose material itself much like a spring absorbs and stores energy upon being displaced. Consequently, upon cessation of the fluid pressure, the stored energy in the elastic memory hose material is released in the form of a positive spring-restoring force which, in turn, acts to forcibly restore the hose to its original oblong or "memorized" shape thereby expelling substantially all of the residual fluid through the hose's open end. Thus, should outside temperatures fall below the fluid freezing level, the oblong hose according to the present invention, having discharged substantially all its residual fluid, is not subject to becoming blocked on reapplication of fluid pressure.

Moreover, owing to its flattened ribbon-like condition in the unpressurized state, it will be appreciated that such hose is easily coiled and takes up less room than conventional hose. Further, oblong hose tends to resist kinking and twisting far better than conventional circular hose.

Generally, the modulus of elasticity of the elastic memory material should be from about 200 pounds per square inch (psi) to about 4,000 psi at 100% stress and the wall thickness of hose 4 should be from about 0.01 to 0.25 inch, although other thicknesses can be employed.

Figure 2:
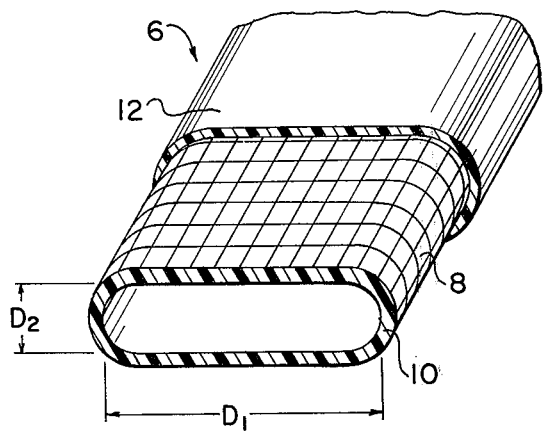
FIG. 2 is a view similar to FIG. 1, but showing a reinforced hose of the invention.

As illustrated in FIG. 2, a reinforced hose 6 includes a reinforcing layer 8 applied about an inner core 10 and over which is applied an outer cover 12 bonded to the inner core 10 and/or reinforcing layer 8.

Inner core 10 may be identical to non-reinforced hose 4. Outer cover 12 is of a material compatible with inner core 10 and reinforcing layer 8. The reinforcing layer 8 may consist of natural or synthetic fibers or fabrics. The layer 8 is applied about the inner core 10 such that it can move with the inner core 10. Generally, a single layer 8 is used although more than one such layer can be employed. If necessary, a tackifier (adhesion inducer) is employed to bind the components of hose 6 together.

Processes are provided for making oblong hose embodying the present invention.

A thermoplastic non-reinforced hose 4 of the invention is produced by feeding an extrudable thermoplastic materila into a convention extruder. Instead of a conventional circular die, an oblong die of suitable configuration is employed to form the hose 4.

A process is provided for producing a reinforced hose 6 having a thermoplastic inner core 10, a reinforcing layer 8 and a thermoplastic outer cover 12. The process may be carried out continuously or in batchwise fashion. A thermoplastic material having an elastic memory is fed into an extruder. The extruder employs the previously described oblong die to form an oblong inner core 10. The inner core 10 is passed through a cooling medium to solidify it. Next, the inner core 10 is rounded out, as by an internal air bubble, prior to application of reinforcing layer 8, to facilitate uniform application thereof by conventional equipment, and reinforcing layer 8 is then applied to the rounded out inner core 10. The inner core 10 with reinforcing layer 8 thereon is thereafter passed into an evacuated chamber, thus creating a vacuum about the periphery of the structure to round it out prior to and during the extrusion of the outer cover 12 thereon. Concurrently, a thermoplastic elastomer is extruded about the structure to form outer cover 21. The hose is cooled to solidify the outer cover 12 and during cooling assumes the desired oblong shape due to the elastic memory of inner core 10.

A process is provided for producing a non-reinforced oblong hose 4 from thermosetting materials by feeding an extrudable thermoset material into an extruder. Instead of a conventional circular die, an oblong die of suitable design is employed to form the hose. After extrusion the hose is cured by conventional methods, thus to provide the desired oblong non-reinforced thermosetting hose 4.

A process is also provided to produce a reinforced oblong hose 6 employing thermosetting materials having an elastic memory. Basically, a conventional uncured circular reinforced hose is prepared employing conventional technology. In one embodiment, a rigid sheath (such as lead) is extruded about the uncured circular hose employing an oblong die. Thereafter the sheathed hose is cured by conventional means. Then, the sheath is stripped off the cured hose 6.

In another embodiment an uncured conventional circular reinforced hose is prepared and a sheath is formed about the hose employing a conventional die having a circular cross-section. Thereafter, the uncured sheathed hose is made oblong between forming rollers. Next, the hose is cured and the sheath is removed, resulting in the desired hose 6.

Other modifications in rigid sheath operation are possible, such as employing an oblong mandrel which imparts the desired shape to hose 6, and is thereafter removed.

Also, the rigid sheath applicator could be replaced by other molding and/or shaping devices to form the oblong hose 6.

The following examples are given to further illustrate the invention and are not limitative of scope.

EXAMPLE I

A non-reinforced oblong hose 4 was formed by extruding a plasticized polyvinyl chloride compound about an oblong die to form hose 4 with a nominal circular internal diameter of five-eighths inch and a wall thickness of 0.065 inch. The cross-sectional dimension $D_1$ was approximately five times the cross-sectional dimension $D_2$. The hose was conveniently wound into a compact package which occupied approximately 60% less space than an equal length of equivalent circular cross-section hose. The hose 4 resisted kinking and twisting during packaging and removal for subsequent use. The hose readily changed to a circular configuration as water pressure was applied and self-drained most of the residual water after water pressure was removed.

EXAMPLE II

A plasticized polyvinyl chloride inner core 10 was prepared according to Example I. Air was introduced at the lead end of the inner core 10 to round it out. A knitting machine applied 12½ courses per inch of nylon yarn to form reinforcing layer 8. A tackifier was applied to the reinforced core.

A vacuum was applied to the periphery of the reinforced core to circularize the hose. An outer cover 12 of plasticized polyvinyl chloride was extruded around the reinforced core. The thickness of the outer cover 12 was 0.035 inch. The hose was cooled in a water bath after exiting the extruder die and during cooling the hose assumed an oblong shape due to the elastic memory of inner core 10. The reinforced hose 6 thus produced was easily formed into a compact package which occupied approximately 50% less space than an equal length of equivalent circular cross-section hose. The hose 6 circularized under hydrostatic pressure and exhibited excellent self-draining properties when pressure was removed. The hose recovered immediately from twisting forces applied in opposite directions at either end.

Tests were conducted to compare the performance characteristics of oblong hose 6 of polyvinyl chloride with conventional circular hose having an equivalent circular diameter and construction. Hydrostatic impulse at elevated pressures, flexure in the area adjacent to the coupling, flow rate, hydrostatic burst and drag-abrasion tests were conducted. Results in all cases showed the oblong hose to perform equal to or better than the equivalent circular hose.

EXAMPLE III

A non-reinforced oblong hose 4 with a nominal circular internal diameter of five-eighths inch and a wall thickness of 0.150 inich was formed by extruding an EPDM synthetic rubber compound about an oblong die and then placing the hose on a metallic curing tray and subsequently vulcanizing in an autoclave for 30 minutes at 320°F. The cross-sectional dimension $D_1$ was approximately five times the cross-sectional dimension $D_2$. The resultant hose 4 was conveniently wound into a compact package which occupied approximately 60% less space than an equal length of circular hose having an equivalent cross-section. The hose 6 resisted kinking and twisting during packaging and removal therefrom for subsequent use. The hose 6 further readily changed to a circular configuration as water pressure was applied and self-drained most of the residual water after the water pressure was removed.

EXAMPLE IV

A reinforced uncured circular hose of nominal five-eighths inch internal diameter having an inner core of rubber, an outer cover of rubber and a reinforcing layer was prepared. The hose was introduced into a conventional lead press having a conventional circular die and a circular lead sheath was applied to said reinforced hose. Thereafter, the uncured sheathed hose was flattened between a pair of rollers such that the ratio of cross-sectional dimension $D_1$ to cross-sectional dimension $D_2$ was about 4 to 1. The sheathed hose was cured and the sheath was removed. The reinforced hose 6 thus produced was easily formed into a compact package which occupied approximately 45% less space than an equal length of equivalent circular cross-section hose. The hosee 6 circularized under hydrostatic pressure and exhibited self-draining properties when pressure was removed. The hose recovered its original configuration immediately after twisting pressures were applied to make it pretzel shaped.

It will be appreciated that in each of the aforementioned examples, the hose was readily circularized or rounded out by application of water pressure made available from a conventional source such as a sink faucet or household water tap. Obviously, the minimum pressure required to substantially circularize a hose according to the present invention will depend upon many factors including, for example, the wall thickness of the hose, its modulus of elasticity, the type and amount of reinforcing material employed, the ambient temperature, and so on, and the minimum pressure will vary as these factors are varied to meet individual requirements. Accordingly, the term "predetermined pressure" as used in the appended claims will be understood to refer broadly to a minimum pressure required to substantially circularize an oblong hose of given characteristics and should not be limited to a single or critical value.

What is claimed is:

1. A process for producing an article useful as hose or the like comprising the following steps:
   a. providing an extrudable material having elastic memory,
   b. extruding said material about an oblong die to form a tube normally having an oblong inside transverse crosssection defining a flattened ribbon-like condition along substantially its entire length, said oblong inside transverse cross-section being characterized by a major inside transverse dimension $D_1$ and a minor inside transverse dimension $D_2$ which is substantially less than dimension $D_1$,
   c. treating said tube to preserve its shape as extruded in step (b)
   d. rounding out said tube,
   e. applying a reinforcing layer to said rounded out tube throughout the length thereof, and
   f. extruding an outer cover about the outer surface of said reinforced tube while maintaining said tube in a rounded out condition
   whereby upon completion of step (f) the elastic memory of said tube material causes said reinforcing layer and said outer cover to assume a normally oblong inside transverse cross-section conforming to said flattened ribbon-like condition along substantially their entire length of said tube.

2. The process defined in claim 1 wherein said step of rounding out the tube prior to application of said reinforcing layer is accomplished by introducing a predetermined fluid pressure within said tube.

3. The process defined in claim 1 wherein said step of maintaining said reinforced tube in said rounded out condition is accomplished by creating a vacuum about the periphery of the reinforced tube during said step of extruding said outer cover.

4. The process of claim 1 wherein said extrudable material is a thermoplastic.

5. The process of claim 1 wherein said step of treating said tube comprises cooling said tube to solidify same prior to the application of said reinforcing layer.

* * * * *